(12) United States Patent
Tawily et al.

(10) Patent No.: US 11,165,809 B2
(45) Date of Patent: Nov. 2, 2021

(54) SYSTEMS METHODS AND COMPUTER STORAGE MEDIA FOR DETECTION OF POTENTIAL CYBER SECURITY VULNERABILITIES IN COMPUTER NETWORKS BY PREMEDIATED EXTERIOR INTRUSION THROUGH LOG-BASED PRE-MAPPED ENTRANCE POINTS

(71) Applicants: Barak Tawily, Ness Ziona (IL); Guy Reuven Halfon, Rehovot (IL)

(72) Inventors: Barak Tawily, Ness Ziona (IL); Guy Reuven Halfon, Rehovot (IL)

(*) Notice: Subject to any disclaimer, the term of this patent is extended or adjusted under 35 U.S.C. 154(b) by 309 days.

(21) Appl. No.: 16/511,907

(22) Filed: Jul. 15, 2019

(65) Prior Publication Data

US 2021/0021627 A1 Jan. 21, 2021

(51) Int. Cl.
*H04L 29/06* (2006.01)
(52) U.S. Cl.
CPC .............................. *H04L 63/1433* (2013.01)
(58) Field of Classification Search
CPC .................................................. H04L 63/1433
See application file for complete search history.

(56) References Cited

U.S. PATENT DOCUMENTS

| | | | | |
|---|---|---|---|---|
| 9,413,722 | B1* | 8/2016 | Ahn | H04L 63/1441 |
| 9,749,336 | B1* | 8/2017 | Zhang | H04L 63/0236 |
| 10,084,817 | B2* | 9/2018 | Saher | G06F 21/53 |
| 10,601,862 | B1* | 3/2020 | Kurupati | G06F 21/554 |
| 10,721,256 | B2* | 7/2020 | Urmanov | G06F 21/552 |
| 2005/0172019 | A1* | 8/2005 | Williamson | H04L 63/145 709/223 |
| 2008/0276319 | A1* | 11/2008 | Rittermann | H04L 63/1425 726/23 |
| 2017/0244743 | A1* | 8/2017 | Key | H04L 63/1425 |
| 2018/0004942 | A1* | 1/2018 | Martin | H04L 63/1425 |
| 2018/0139215 | A1* | 5/2018 | Neuvirth-Telem | H04L 67/146 |
| 2019/0052675 | A1* | 2/2019 | Krebs | H04L 63/1416 |
| 2019/0260663 | A1* | 8/2019 | Pueblas | H04L 41/0213 |
| 2020/0028861 | A1* | 1/2020 | Pritzkau | H04L 63/1416 |
| 2020/0327221 | A1* | 10/2020 | Street | H04L 63/1425 |

* cited by examiner

*Primary Examiner* — Sarah Su
(74) *Attorney, Agent, or Firm* — Mark David Torche; Patwrite Law

(57) ABSTRACT

A system method and computer media for detection of potential cyber security vulnerabilities in a computer network are described; the system includes an interface configured for receiving a log file of a target computer system, an analyzing module, a mapping module configured to map a plurality of potential entrance points, a code generator for generating a computer code for exterior intrusion and a testing server configured for transmitting the computer code to the target system and collecting at least one response member, transmitted in response to the computer code.

20 Claims, 5 Drawing Sheets

SYSTEMS METHODS AND COMPUTER STORAGE MEDIA FOR DETECTION OF POTENTIAL CYBER SECURITY VULNERABILITIES IN COMPUTER NETWORKS BY PREMEDIATED EXTERIOR INTRUSION THROUGH LOG-BASED PRE-MAPPED ENTRANCE POINTS

TECHNICAL FIELD

In general, the present invention pertains to the art of computer science. In particular, the invention relates to systems methods and computer storage media of premediated exterior intrusion through log-based pre-mapped entrance points of computer network for detection of potential cyber security vulnerabilities.

BACKGROUND ART

The current state of the art, typically referred to as "Application security testing", is generally divided into three main types. The first type, often referred to as "Blackbox (dynamic)", relates to blindly sending requests and determine if a vulnerability exists purely by analyzing the response. This first type of application security testing, colloquially referred to as "fishing", is generally characterized by consumption of intensive computing and/or networking resources as well as by relatively low efficacy.

The second type frequently referred to as "Greybox (static)" relates to sending requests as well as observe the target systems memory and/or CPU, typically via system calls in order to determine if the system is vulnerable. This second type of application security testing inherently entails providing an access to the system been tested.

The third type colloquially referred to as "Whitebox" relates to looking at source code to determine if vulnerabilities exist. This third type of application security testing inherently entails providing an access to the source code of the system been tested as well as characterized by consumption of intensive computing resources and by relatively low efficacy.

It is believed that the current state of the art is represented by the following patent literature: U.S. Pat. Nos. 8,949,994, 9,781,146, 9,876,813, 9,977,904, US2015371047, US2017353483, CN106911635, CN107229867 and CN107392028.

U.S. Pat. No. 9,977,904 teaches systems and methods for performing automatic, large-scale analysis of mobile applications to determine and analyze application vulnerability. The systems and methods disclosed in U.S. Pat. No. 9,977,904 include identifying potentially vulnerable applications, identifying the application entry points that lead to vulnerable behavior, and generating smart input for text fields. An automated framework is implemented in U.S. Pat. No. 9,977,904 to run in parallel on multiple emulators, while collecting vital information.

SUMMARY OF THE INVENTION

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

The invention was made in view of the deficiencies of the prior art and provides systems, methods and processes for overcoming these deficiencies. According to some aspects and embodiments of the present invention, there is provided a system for detection of potential cyber security vulnerabilities in computer network.

According to some other aspects and embodiments of the present invention, there are provided methods for detection of potential cyber security vulnerabilities.

In accordance with yet other aspects and embodiments of the present invention, there are provided computer storage media for detection of potential cyber security vulnerabilities.

According to still some other aspects of the present invention, there are provided systems for exterior intrusion through log-based pre-mapped entrance points into computer network.

According to yet still other aspects of the present invention, there are provided methods and computer storage media for exterior intrusion through log-based pre-mapped entrance points into computer network.

DEFINITIONS

Whenever the terms "server", "agent", "system" or "module" is used herein, it should be construed as a computer program, including any portion or alternative thereof, e.g. script, command, application programing interface (API), graphical user interface (GUI), etc., and/or computational hardware components, such as logic devices and application integrated circuits, computer storage media, computer micro-processors and random access memory (RAM), a display, input devices and networking terminals, including configurations, assemblies or sub-assemblies thereof, as well as any combination of the former with the latter.

The term storage as referred to herein is to be construed as including one or more of volatile or non-volatile memory, hard drives, flash storage devices and/or optical storage devices, e.g. CDs, DVDs, etc. The term "computer-readable media" as referred to herein can include transitory and non-transitory computer-readable instructions, whereas the term "computer-readable storage media" includes only non-transitory readable storage media and excludes any transitory instructions or signals. The terms "computer-readable media" and "computer-readable storage media" encompass only a computer-readable media that can be considered a manufacture (i.e., article of manufacture) or a machine. Computer-readable storage media includes "computer-readable storage devices". Examples of computer-readable storage devices include volatile storage media, such as RAM, and non-volatile storage media, such as hard drives, optical discs, and flash memory, among others.

The term integrated shall be construed inter alia as operable on the same machine and/or executed by the same computer program. Depending on the actual deployment of the method, its implementation and topology, integration of agents and/or integration into modules as well as the terms "transfer", "relaying", "transmitting", "forwarding", "retrieving", "accessing", "pushed" or similar refer to any interaction between agents via methods inter alia including: function calling, Application Programming Interface (API), Inter-Process Communication (IPC), Remote Procedure Call (RPC) and/or communicating using of any standard or proprietary protocol, such as SMTP, IMAP, MAPI, OMA-IMPS, OMA-PAG, OMA-MWG, SIP/SIMPLE, XMPP, SMPP.

The term network, as referred to herein, should be understood as encompassing any type of computer and/or data network, in a non-limiting manner including one or more intranets, extranets, local area networks (LAN), wide area networks (WAN), wireless networks (WIFI), the Internet, including the world wide web, and/or other arrangements for enabling communication between the computing devices, whether in real time or otherwise, e.g., via time shifting, cashing, batch processing, etc.

The term log, as referred to herein, includes a computer readable data structure, formatted for interpretation by a processor, in which user inputs are recorded. A log also can include a listing of events, for example presentation of menu items, initiated by a computer program responsive to the user inputs.

The terms notification and/or message as used herein refer to a communication provided by a notification system to a message recipient device. A notification and/or message may be used to inform one or more recipient device, for example a notification and/or messages may be provided to the one or more recipient device, in a non-limiting manner using SMS texts, MMS texts, E-mail, Instant Messages, mobile device push notifications, HTTP requests, voice calls, telephone calls, Voice Over IP (VOIP) calls or alike, library function calls, API calls, predefined protocol, URLs as well as any signals transferred, transmitted or relayed, as defined herein or any combination thereof.

Whenever in the specification hereunder and particularly in the claims appended hereto a verb, whether in base form or any tense, a gerund or present participle or a past participle are used, such terms as well as preferably other terms are to be construed as actual or constructive, meaning inter alia as being merely optionally or potentially performed and/or being only performed anytime in future. The terms essentially and substantially, or similar relative terms, are to be construed in accordance with their ordinary dictionary meaning, namely mostly but not completely.

As used herein, the term "or" is an inclusive "or" operator, equivalent to the term "and/or," unless the context clearly dictates otherwise; whereas the term "and" as used herein is also the alternative operator equivalent to the term "and/or," unless the context clearly dictates otherwise.

It should be understood, however, that neither the briefly synopsized summary nor particular definitions hereinabove are not to limit interpretation of the invention to the specific forms and examples but rather on the contrary are to cover all modifications, equivalents and alternatives falling within the scope of the invention.

DESCRIPTION OF THE DRAWINGS

The present invention will be understood and appreciated more comprehensively from the following detailed description taken in conjunction with the appended drawings in which.

Figure 1:
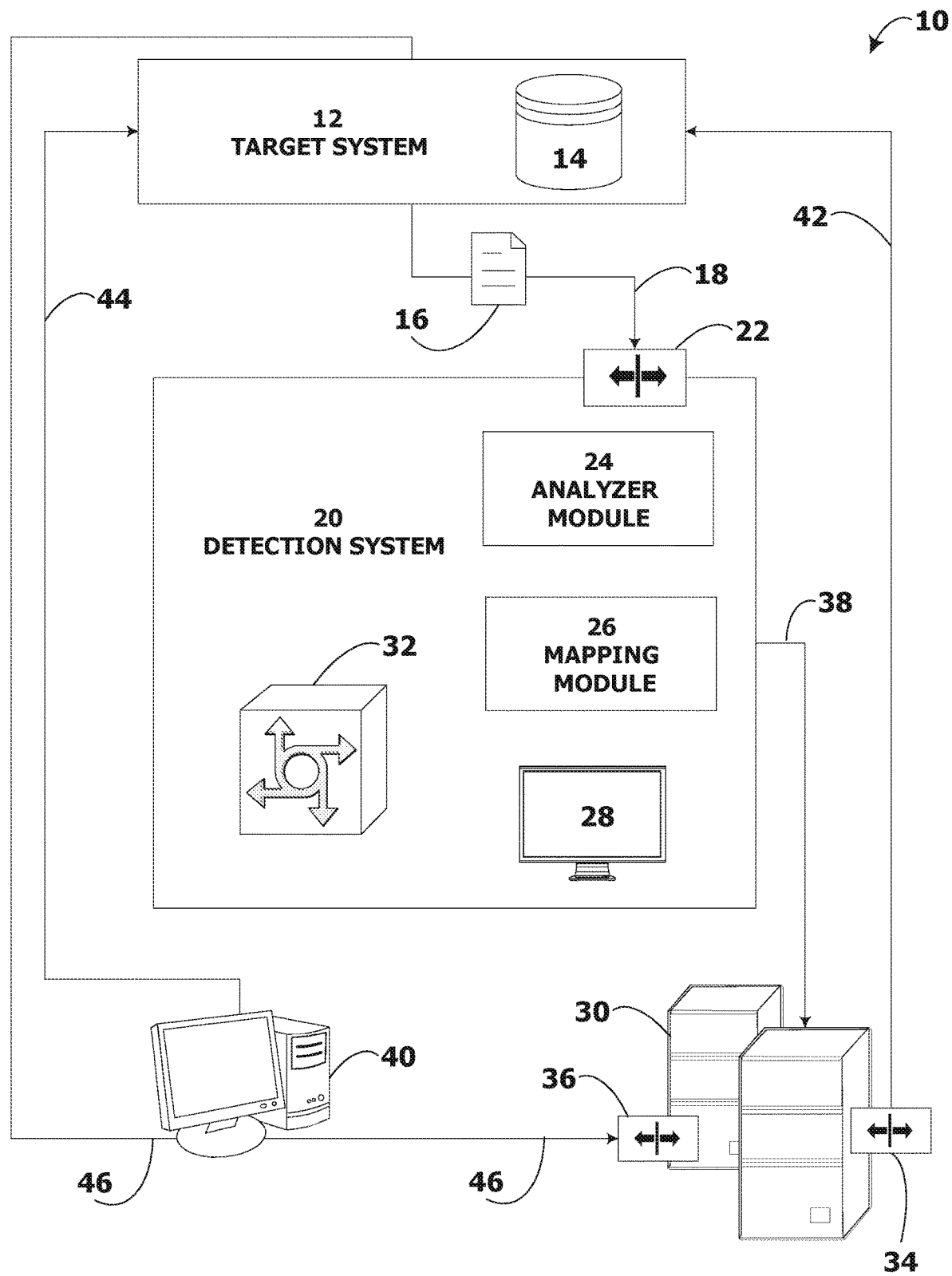
FIG. 1 is a schematic block diagram of an embodiment of a system for exterior intrusion through log-based pre-mapped entrance points of computer network for detection of potential cyber security vulnerabilities.

While the invention is susceptible to various modifications and alternative forms, specific embodiments thereof have been shown merely by way of example in the drawings. The drawings are not necessarily complete and not essentially to scale; emphasis instead being placed upon clearly illustrating the principles underlying the present invention.

DETAILED DISCLOSURE OF EMBODIMENTS

Illustrative embodiments of the invention are described below. In the interest of clarity, not all features of actual implementation are described in this specification. It will of course be appreciated that in the development of any such actual embodiment, numerous implementation-specific decisions must be made to achieve the developers' specific goals, such as compliance with technology- or business-related constraints, which may vary from one implementation to another. Moreover, it will be appreciated that the effort of such a development might be complex and time-consuming, but would nevertheless be a routine undertaking for those of ordinary skill in the art having the benefit of this disclosure.

In accordance with some embodiments of the present invention, reference is now made to FIG. 1, showing system 10 for detection of potential cyber security vulnerabilities in computer networks by premediated exterior intrusion through log-based pre-mapped entrance points. System 10 includes target system 12, to be subjected to detection of potential cyber security vulnerabilities, by premediated exterior intrusion through log-based pre-mapped entrance points. Target system 12 includes at least one storage device 14, associated therewith, configured for storing at least one log of target system 12.

Target system 12 is operationally connected via connection 18, to interface 22 of detection system 20. Connection 18 is configured for transferring log 16 of target system 12, from storage device 14, to detection system 20. It is noted that interface 22 of detection system 20 is optionally on offline interface, does not providing an access to the target system 12 and/or the source code thereof. Log 16 is transferable from storage device 14 of target system 12 to interface 22 of detection system 20 in a non-limiting manner by uploading log 16 to system 20.

Detection system 20 further comprises analyzer module 24. Analyzer module 24 is configured for scanning and analyzing log 16 of target system 12. Detection system 20 further comprises mapping module 26. Mapping module 26 is configured for identifying and mapping in log 16 of target system 12 analyzed by analyzer module 24 a plurality of entrance points, from which target system 12 can be accessed to and/or interacted with. Examples of entrance points, in a non-limiting manner, include URL or URI, IP address, MAC address, of target system 12 network connectable resource, such as an API, predefined protocol and/or network terminal of target system 12.

In some embodiments, where the contents of storage device 14 of target system 12 is not altered, the selection and/or prioritization of entrance points is performable, inter alia, by identifying the interfaces mapped and identified by mapping module 26 which are characterized by: (1) the most desired alteration of target system 12 behavior, (2) the least amount of authentication and/or handshake features, (3) require the least effort from detection system 20 to produce and/or generate. In other embodiments, where the contents of storage device 14 of target system 12 is altered, the selection and/or prioritization of entrance points is performable, in a non-limiting manner, by identifying one or more of the features, attributes and configurations of target system 12 mapped and identified by mapping module 26 which are characterized by: (1) the most desired alteration of behavior of target system 12, and/or (2) require the least effort from detection system 20 to alter the contents of storage device 14 of target system 12.

Detection system 20 optionally further comprises display 28. Display 28 is configured for displaying a GUI of detection system 20. The GUI of detection system 20 is configured to display at least a portion of the code related to entrance points identified and mapped in log 16 of target system 12 by mapping module 26. The GUI of detection system 20 is preferably further configured to select particular entrance point/s from a plurality of entrance points mapped in log 16 of target system 12 by mapping module 26.

Detection system 20 further comprises code generator 32. Code generator 32 is configured for generating a custom malicious code, configured for premediated exterior intrusion through the particular entrance point/s selected from a plurality of entrance points mapped in log 16 of target system 12 by mapping module 26. The malicious code is, in a non-limiting manner, a set of one or more messages built according to the message structures typical to the communication traffic between target system 12 and/or its interfacing counterparties, which have been identified by analyzer module 24 and are mapped by detection system 20.

In accordance with another embodiment, the code, in a non-limiting manner, includes a set of computer instructions configured to be stored in non-volatile memory of target system 12 by altering the contents of storage device 14 of target system 12. In some examples, code generator 32 comprises display 28 configured for displaying the custom code for premediated exterior intrusion through the particular entrance point's, selected via the GUI of detection system 20. In other examples, code generator 32 comprises a peripheral device configured for typing and/or editing and/or reviewing the custom code for premediated exterior intrusion through the particular entrance point/s, selected via the GUI of detection system 20.

System 10 further includes testing server 30. Testing server 30 is configured for receiving the custom code for premediated exterior intrusion through the selected entrance point's, via connection 38, from detection system 20. Testing server 30 is further configured for receiving the specification of how to send the custom code for premediated exterior intrusion, received from detection system 20, to the selected entrance point/s of target system 12.

Testing server 30 includes sending interface 34. Sending interface 34 of testing server 30 is configured for transmitting the custom code for premediated exterior intrusion, received from detection system 20, to the selected entrance point's of target system 12, via connection 42. Testing server 30 further includes receiving interface 36. Receiving interface 36 of testing server 30 is configured for receiving, via connection 46, a response related to and/or triggered by the custom code, after the exterior intrusion thereof through the selected entrance point/s into target system 12, from sending interface 34 of testing server 30, via connection 42.

Testing server 30 preferably further includes a detection module (not shown). The detection module is configured for comparing the response received from target system 12 to the response expected by alteration of target system 12 behavior by the code transmitted to target system 12. If the received response matches the expected response, detection system 20 reaches the conclusion that testing server 30 caused target system 12 to behave in the expected and/or anticipated manner, in response to the exterior intrusion, thus indicating an exemplary cyber security vulnerability.

System 10 further includes client computational device 40. Client computational device 40 is a counterparty of target system 12, for which target system 12 acts, in a non-limiting manner, as a server. Client computational device 40 is configured to transmit data to target system 12 via connection 44 and to receive data from target system 12 via connection 46. In accordance with one embodiment of the present invention, the malicious code generated by code generator 32 and transmitted by testing server 30 from sending terminal 34 via connection 42 to target system 12 is configured to trigger a response from client computational device 40 upon transmission of a datum from target system 12 to client computational device 40, causing client computational device 40 to transmit some privacy sensitive information, such as credentials of client computational device 40, to receiving interface 36 of testing server 30, via connection 46, thereby exploiting relatively low cyber security settings of client computational device 40. Testing server 30 in turn is configured to receive to receiving interface 36 the response from client computational device 40, via connection 46.

Figure 2:
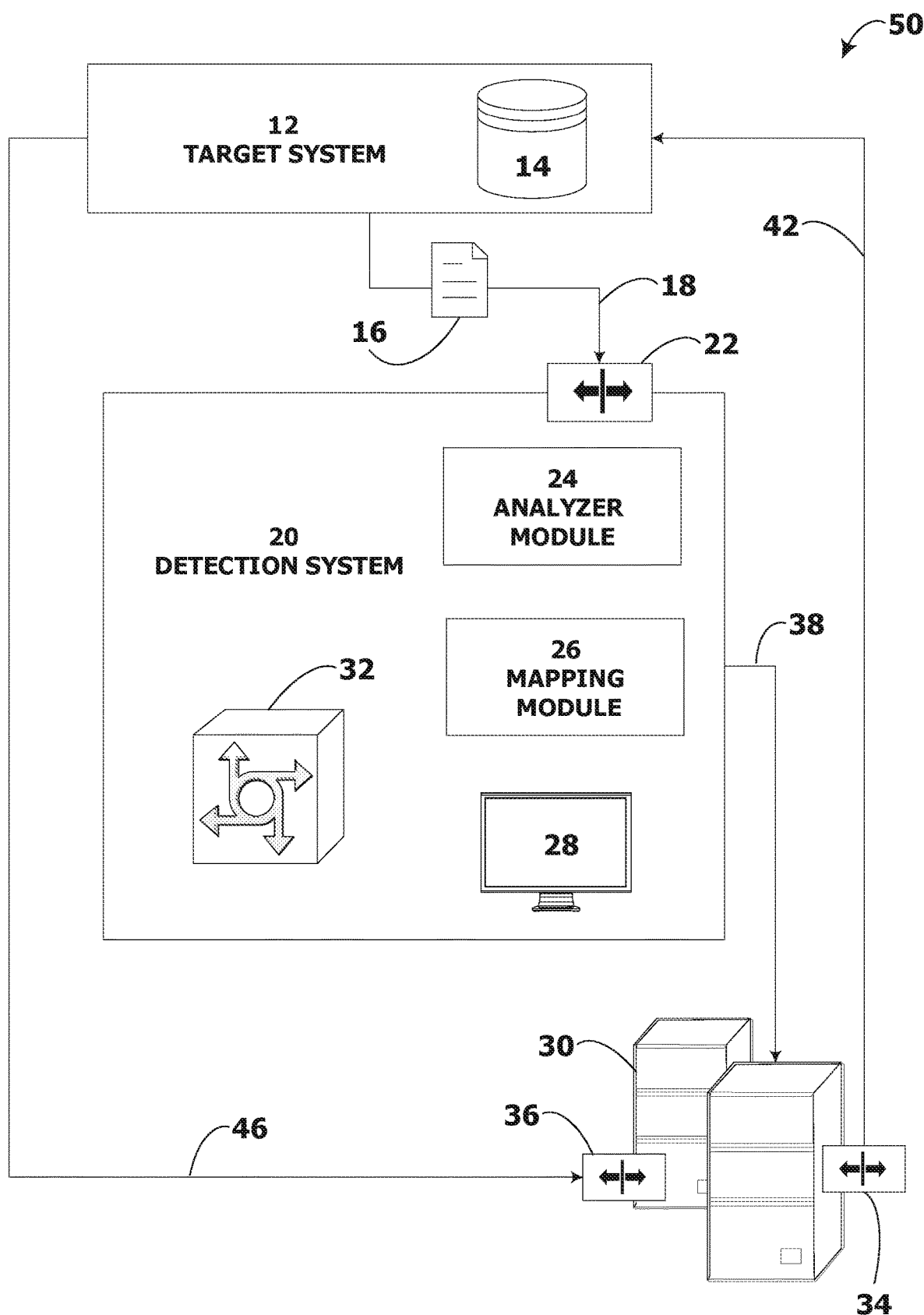
FIG. 2 is a schematic block diagram of another embodiment of a system for exterior intrusion through log-based pre-mapped entrance points of computer network for detection of potential cyber security vulnerabilities.

In accordance with some embodiments of the present invention, reference is now made to FIG. 2, showing system 50 for detection of potential cyber security vulnerabilities in computer networks by premediated exterior intrusion through log-based pre-mapped entrance points. System 50 is essentially similar to system 10 shown in FIG. 1 and described hereinbefore by sharing the following constituents: 12, 14, 16, 18, 20, 22, 24, 26, 28, 30, 32, 34, 36, 38, 42, 46. System 50 however does not include client computational device 40 and connection 44 which are constituents unique to system 10 shown in FIG. 1 and described hereinbefore. In accordance with an embodiment of the present invention, the code generated by code generator 32 and transmitted from sending terminal 34 via connection 42 to target system 12 by testing server 30 is configured to alter the behavior target system 12. causing target system 12 to transmit some sensitive information, such as credentials and/or addresses of clients of target system 12, to receiving interface 36 of testing server 30, via connection 46. Testing server 30 in turn is configured to receive to receiving interface 36 the response from target system 12, via connection 46.

Figure 3:
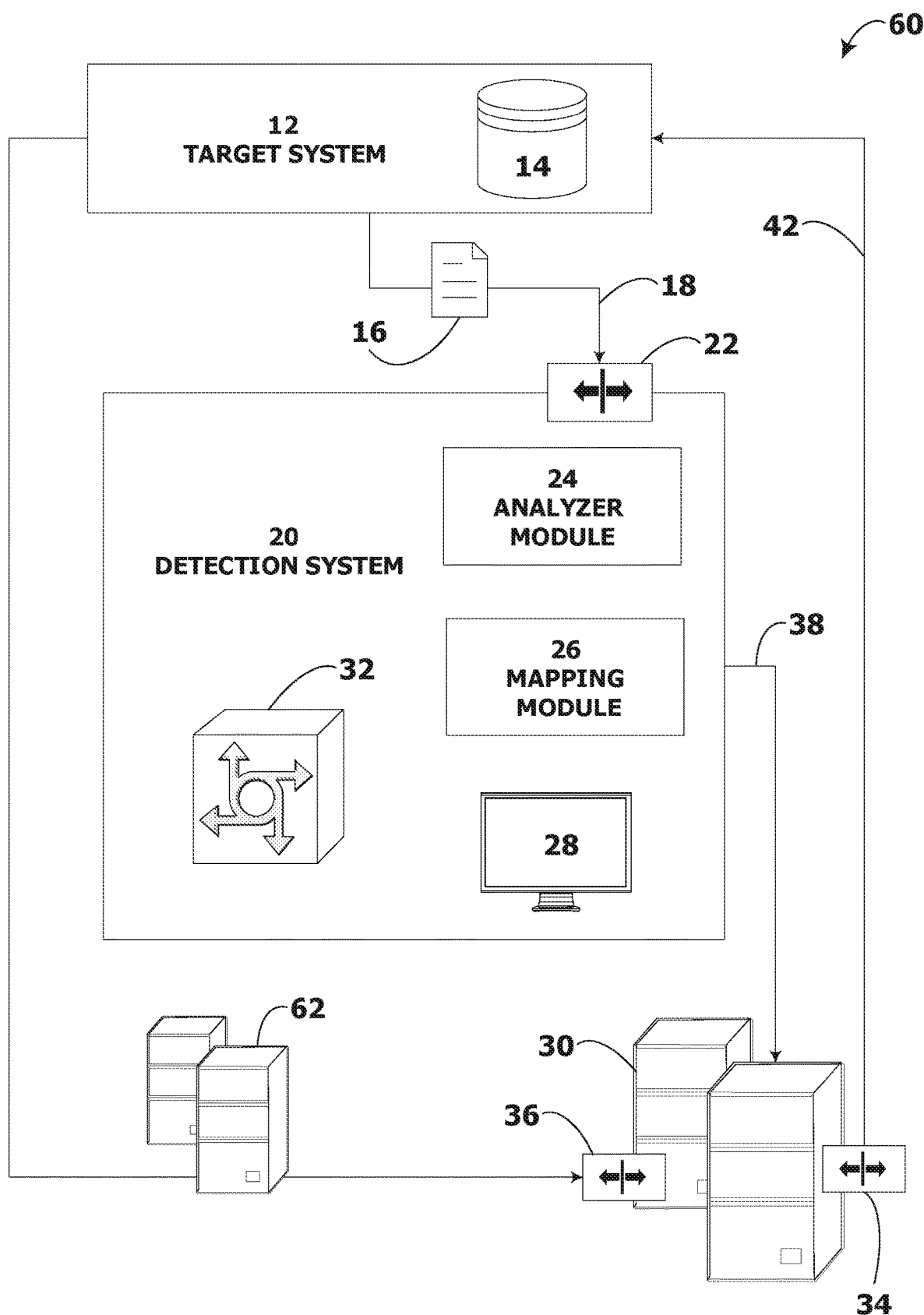
FIG. 3 is a schematic block diagram of yet another embodiment of a system for exterior intrusion through log-based pre-mapped entrance points of computer network for detection of potential cyber security vulnerabilities.

In accordance with some embodiments of the present invention, reference is now made to FIG. 3, showing system 60 for detection of potential cyber security vulnerabilities in computer networks by premediated exterior intrusion through log-based pre-mapped entrance points. System 60 is essentially similar to system 10 shown in FIG. 1 and described hereinbefore by sharing the following constituents: 12, 14, 16, 18, 20, 22, 24, 26, 28, 30, 32, 34, 36, 38. System 60 however does not include client computational device 40 and connection 44 which are constituents of system 10 shown in FIG. 1 and described hereinbefore. System 60 further includes third-side server 62. In accordance with an embodiment of the present invention, the malicious code generated by code generator 32 and transmitted to target system 12 by testing server 30 from sending terminal 34 via connection 42 is configured for altering the behavior of target system 12, causing target system 12 to transmit some sensitive information, such as credentials and/or addresses of clients of target system 12, to third-side server 62, thereby exploiting preset security authorizations between target system 12 and third-side server 62. Testing server 30 in turn is configured to access third-side server 62, so as to collect to receiving interface 36 of testing server 30 the response received by third-side server 62 from target system 12, in response to the malicious code generated by code generator 32 and transmitted to target system 12 by testing server 30.

Figure 4:
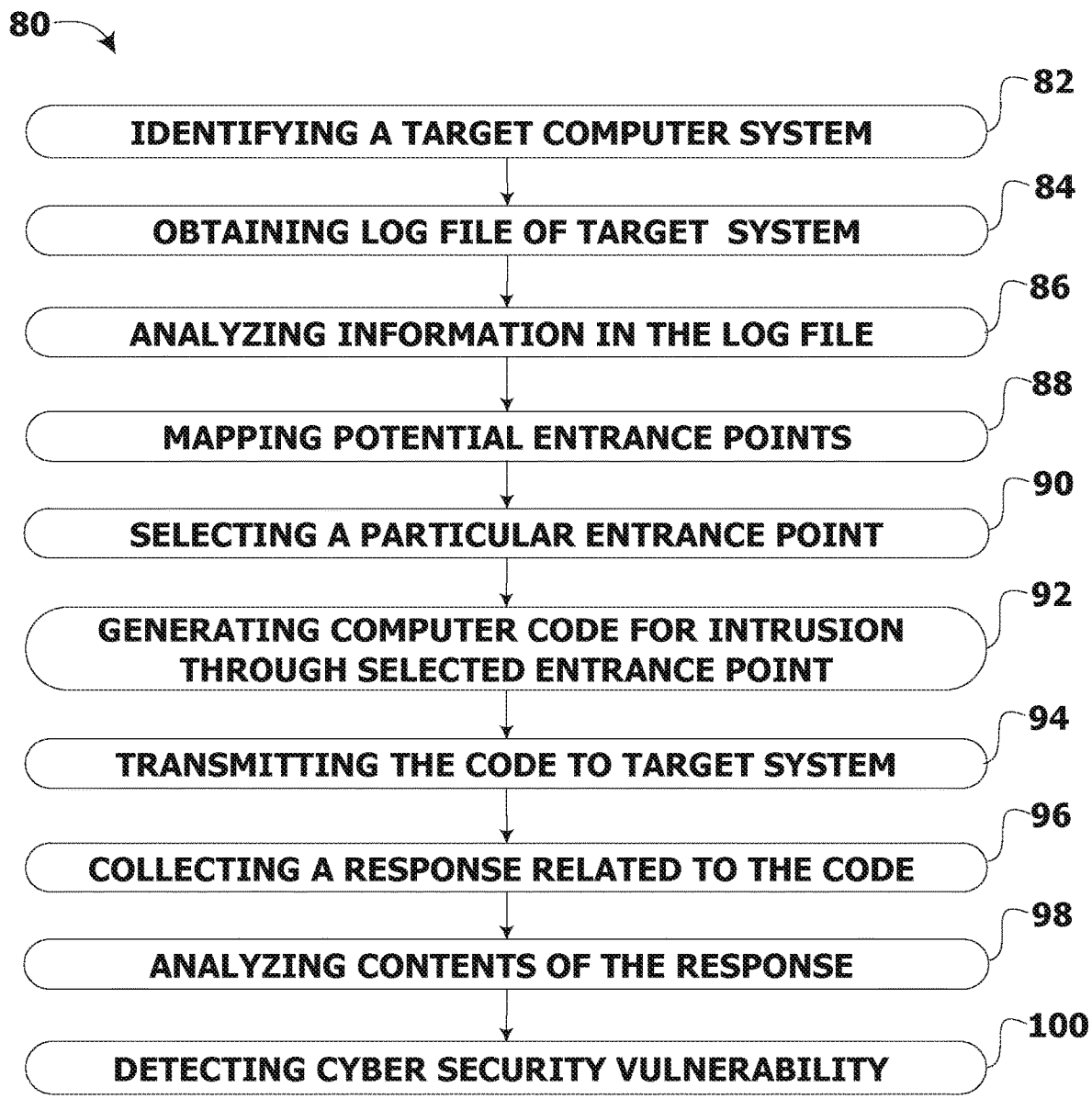
FIG. 4 is a high-level flowchart of an embodiment of a method for exterior intrusion through log-based pre-mapped entrance points of computer network for detection of potential cyber security vulnerabilities.

In accordance with some embodiments of the present invention, reference is now made to FIG. 4, showing a high-level flowchart of an embodiment of method 80 for exterior intrusion through log-based pre-mapped entrance points of computer network for detection of potential cyber security vulnerabilities. Method 80 commences at step 82 of identifying a target computer system. At step 82 target system 12 is identified in terms of learning target system 12 functions, goals, structure, interfaces and interfacing counterparties or peripheries connectable thereto.

Method 80 continues to step 84 of obtaining a log file of target system. Target system 12 is typically configured for continuously logging its activities in log file 16 which is stored on storage device 14. These activities, in a non-limiting manner, include communication traffic to and/or from target system 12 interfacing counterparties or peripheries connectable thereto. At step 84 log file 16 is transferred from target system to detection system 20. Log file 16 transfer to detection system 20 interface 22 is done, in a non-limiting manner, by communication network via connection 18 and/or portable storage device.

Method 80 continues to step 86 of analyzing the information in log file 16. At step 86 log file 16 is firstly analyzed by analyzer module 24 of detection system 20. Analyzer module 24 is configured to scan and analyze log file 16 to identify message structures from the communication traffic between target system 12 to and/or from its interfacing counterparties or peripheries connectable thereto, logged into log file 16. Moreover, analyzer module 24 is preferably further configured to scan and analyze log file 16 for full addresses of target system 12 and its interfacing counterparties or peripheries connectable thereto, such as IP address, port, and MAC address. In accordance to another embodiment of the present invention, analyzer module 24 is configured to scan and analyze log file 16 for features, attributes and configurations of target system 12, which upon changing and/or replacing and/or otherwise altering the contents of storage device thereof, will alter the behavior of target system 12.

Method 80 continues to step 88 of mapping potential entrance points. At step 88 log file 16 is mapped by mapping module 26 of detection system 20, preferably taking into account the analysis results of analyzer module 24 from step 88. Mapping module 26 is preferably configured to identify and map entrance points from which target system 12 can be accessed to and/or interacted with. This mapping, in a non-limiting manner, is performed by identifying the interfaces between target system 12 and its interfacing counterparties or peripheries connectable thereto, the message structures of which have been identified at step 86 and are known to detection system 20. In accordance with another embodiment of the present invention, the mapping, in a non-limiting manner, is performed by identifying features, attributes and configurations of target system 12, which have been identified at step 86, which constitute a potential entrance point.

Method 80 continues to step 90 of selecting particular entrance points. At step 90 mapping module 26 is used to select a particular entrance point, from which target system 12 is to be later accessed to and/or interacted with. The selection is performed, in a non-limiting manner, by identifying one or more of the interfaces mapped and identified at step 88 which exhibit a preference for: (1) alteration of the behavior of target system 12, (2) characterized by the least amount of authentication and/or security features, and/or (3) require lesser resources of detection system 20. In accordance with another embodiment of the present invention, the selection is performed, in a non-limiting manner, by identifying one or more of the features, attributes and configurations of target system 12 identified at step 88 which exhibit a preference for: (1) alteration of target system 12 behavior, and/or (2) require lesser resources of detection system 20 to change and/or replace or otherwise alter the data and/or files stored on non-volatile memory and/or storage device 14 of target system 12.

Method 80 continues to step 92 of generating computer code for intrusion trough a selected entrance point. At step 92 code generator 32 generates a custom malicious code configured for premediated exterior intrusion through the particular entrance point's selected at step 90. The code, in a non-limiting manner, includes a set of messages built according to message structures from the communication traffic between target system 12 to and/or from its interfacing counterparties or peripheries connectable thereto, which have been identified at step 86 and are known to detection system 20. In accordance with another embodiment of the present invention, the code, in a non-limiting manner, includes a set of computer instructions configured to reside in target system 12 non-volatile memory and alter target system 12 behavior. In some embodiments, the code is manually typed, edited and/or reviewed by a peripheral device and display 28 comprised in code generator 32.

Method 80 continues to step 94 of transmitting the malicious code to target system 12. At step 94 the code generated at step 92 and the specification of how to send the code to the respective entrance point/s of target system 12 are transmitted from detection system 20 to testing server 30. The malicious code is then sent by testing server 30 from sending interface 34 via connection 42 to the selected entrance point/s of target system 12.

Method 80 continues to step 96 of collecting a response related to the malicious code. The code transmitted to target system 12 at step 94 alters the behavior of target system 12 in a way that testing server 30 is configured to detect at step 96. Testing server 30 collects to receiving interface 36 via connection 46 at step 96 the response related to and/or triggered by the malicious code, code transmitted to target system 12 at step 94, In accordance to another embodiment of the present invention, the response is collected 12 at step 94 from a counterparty of target system 12. Such a counterparty, in a non-limiting manner, includes client computational device 40 which target system 12 acts as a server for, and/or a third side server 62.

The response, in a non-limiting manner, includes an informative message, target system 12 activity log, data stored in target system 12 non-volatile memory and/or storage device 14, client computational device 40 and/or third side server 62 activity log, data stored in client computational device 40 and/or third side server 62 non-volatile and/or volatile memory, data transmitted in response to a datum transmitted by target system 12 to client computational device 40, and/or re-directed data from any other counterparties of target system 12.

Method 80 continues to step 98 of analyzing the contents of the response. At step 98 the response received at step 96 is analyzed by testing server 30 and/or detection system 12. The analysis is performed, in a non-limiting manner, by identifying the response received in response to and/or triggered by the malicious code, code transmitted to target system 12 at step 94.

Method 80 typically terminates at step 100 of detecting cyber security vulnerability. At step 100 cyber security vulnerability is detected by testing server 30 and/or detection system 12, based on the results of the analysis performed at step 98. The detection is performed, in a non-limiting manner, by comparing the response received from target system 12 to the response expected by alteration of the behavior of target system 12 in response to and/or triggered by the malicious code, code transmitted to target system 12 at step 94.

Figure 5:
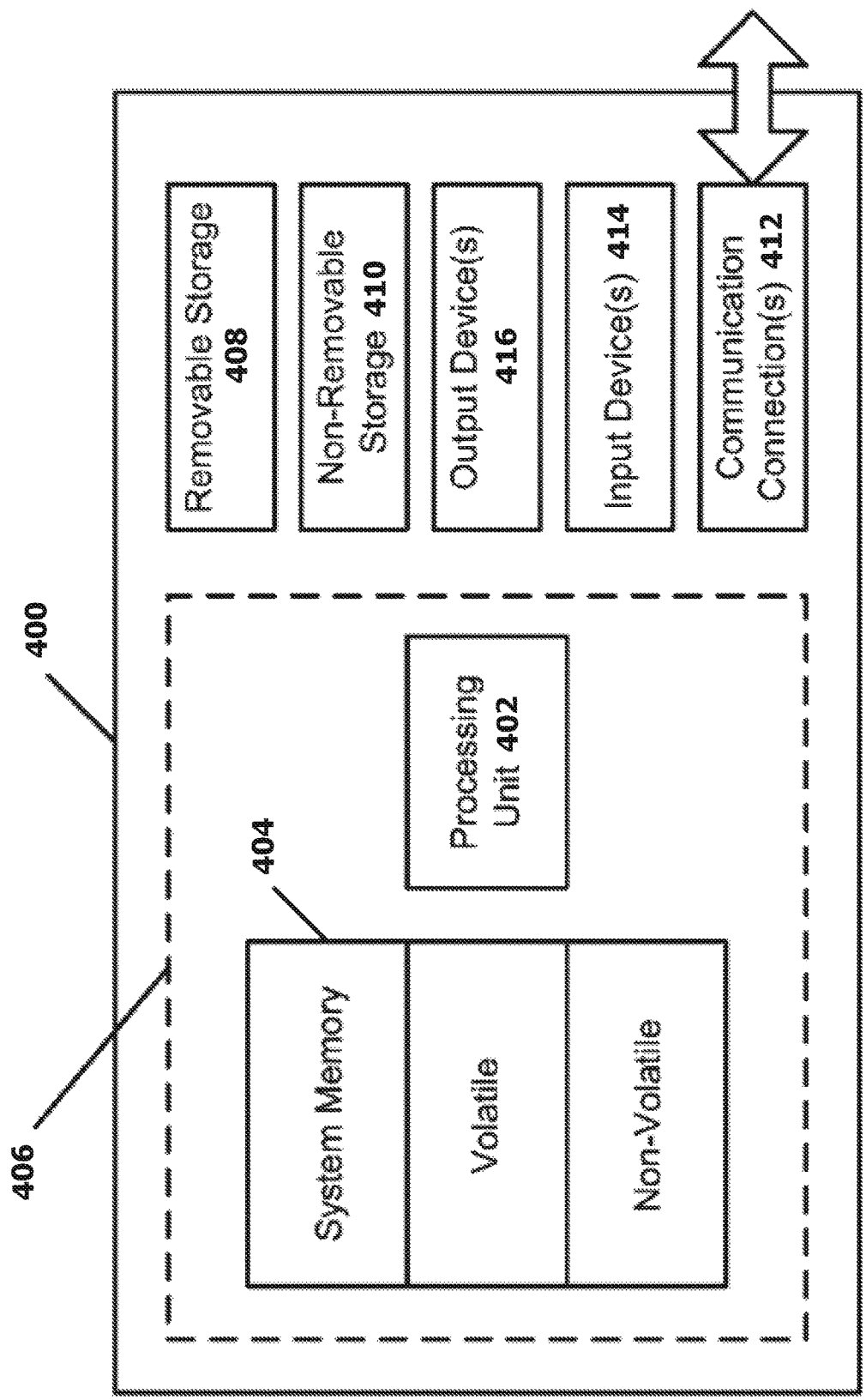
FIG. 5 is a schematic diagram of an exemplary computing environment.

With reference to FIG. 5, an exemplary system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as random access memory or RAM), non-volatile (such as read-only memory (ROM), flash memory, etc.), or some combination of the two. This most basic configuration is illustrated in FIG. 5 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 5 by removable storage 408 and non-removable storage 410.

Computing device 400 typically includes a variety of computer readable media. Computer readable media can be any available media that can be accessed by computing device 400 and include both volatile and non-volatile media, and removable and non-removable media. Computer storage media include volatile and non-volatile, and removable and non-removable media implemented in any method or technology for storage of information such as computer readable instructions, data structures, program modules or other data. Memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may contain communications connection(s) 412 that allow the device to communicate with other devices. Computing device 400 may also have input device(s) 414 such as a keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

It will be appreciated by persons skilled in the art that the present invention is not limited by what has been particularly shown and described herein above.

The invention claimed is:

1. A detection system for discovering potential cyber security vulnerabilities in a computer network comprises:
   (a) an interface configured for receiving at least one log file of a target computer system to be subjected to detecting by said detection system;
   (b) an analyzing module configured to analyze information contained in said at least one log file of said target computer system received via said interface;
   (c) a mapping module configured to map a plurality of potential entrance points from said information contained in said at least one log file of said target computer system, accessible via said computer network, and to select a particular entrance point from said plurality of potential entrance points;
   (d) a computer code generator configured for generating a customary malicious computer code configured for exterior intrusion through said particular entrance point, selected by said mapping module;
   (e) a testing server comprising:
      (I) a sending terminal configured for transmitting said customary malicious computer code, generated by said computer code generator, via said computer network, to said particular entrance point of said target computer system, selected by said mapping module;
      (II) a receiving terminal configured for collecting at least one response member comprising computer data transmitted by a computing device via said computer network, in response to said customary malicious computer code transmitted via said computer network to said target computer system;
      (III) a detection module configured for analyzing contents of said at least one response member and detecting presence of at least one computer datum associated with said customary malicious computer code in said at least one response member, thereby discovering a potential cyber security vulnerability in said target computer network, associated with said particular entrance point to said target computer system, selected by said mapping module, upon detecting presence of said at least one computer datum associated with said customary malicious computer code in said at least one response member.

2. The system as in claim 1, wherein said receiving terminal is configured for collecting at least one response member selected from the group consisting of:
(a) computer data transmitted by said target computer system via said computer network to said receiving terminal of said testing server, in response to said customary malicious computer code transmitted from said sending terminal of said testing server via said computer network to said target computer system;
(b) computer data transmitted by said target computer system via said computer network to a third-party server, in response to said customary malicious computer code transmitted from said sending terminal of said testing server via said computer network to said target computer system.

3. The system as in claim 1, wherein a datum is transmitted by a client computational device via said computer network to said receiving terminal of said testing server, in response to a computer data received by said client computational device from said target computer system via said computer network.

4. The system as in claim 1, wherein said customary malicious computer code generated by said generator comprises a message constructed according to message structures identified in said log file, indicative of communication traffic between said target system and interfacing counterparties thereof.

5. The system as in claim 1, wherein said customary malicious computer code generated by said generator comprises a set of computer instructions configured to reside in non-volatile memory of said target system, thereby altering a behavior of said target system.

6. The system as in claim 1, wherein said mapping module is configured to select a particular entrance point by identifying at least one interface mapped by said mapping module, based on a preset preference.

7. The system as in claim 1, wherein said mapping module is configured to select a particular entrance point, based on a preset preference related to an alteration of non-volatile memory of said target system, altering a behavior of said target system.

8. A method of detecting potential cyber security vulnerabilities in a computer network comprises:
(a) identifying a target computer system to be subjected to said detecting;
(b) obtaining at least one log file of said target computer system;
(c) analyzing information contained in said at least one log file of said target computer system;
(d) mapping a plurality of potential entrance points, accessible via said computer network, from said information contained in said at least one log file of said target computer system;
(e) selecting a particular entrance point of said target computer system, from said plurality of potential entrance points, mapped at said step of mapping;
(f) generating a customary malicious computer code configured for exterior intrusion through said particular entrance point, selected at said step of selecting;
(g) transmitting said customary malicious computer code, generated at said step of generating, from a testing server to said particular entrance point of said target computer system, via said computer network;
(h) collecting at least one response member comprising computer data transmitted by a computing device via said computer network, in response to said customary malicious computer code transmitted via said computer network to said target computer system;
(i) analyzing contents of said at least one response member, for presence of at least one computer datum associated with said customary malicious computer code in said at least one response member;
(j) detecting a potential cyber security vulnerability in said target computer network, associated with said particular entrance point of said target computer system, upon detecting presence of said at least one computer datum associated with said customary malicious computer code in said at least one response member.

9. The method as in claim 8, wherein said step of collecting comprises collecting at least one response is at least one member selected from the group consisting of:
(a) collecting computer data transmitted by said target computer system via said computer network to said receiving terminal of said testing server, in response to said customary malicious computer code transmitted from said sending terminal of said testing server via said computer network to said target computer system;
(b) collecting computer data transmitted by said target computer system via said computer network to a third-party server, in response to said customary malicious computer code transmitted from said sending terminal of said testing server via said computer network to said target computer system.

10. The method as in claim 8, wherein said step of collecting comprises collecting a datum is transmitted by a client computational device via said computer network to said receiving terminal of said testing server, in response to a computer data received by said client computational device from said target computer system via said computer network.

11. The method as in claim 8, wherein said step of generating said customary malicious computer code comprises generating at least one message according to message structures identified in said log file, indicative of communication traffic between said target system and interfacing counterparties thereof.

12. The method as in claim 8, wherein said step of generating said customary malicious computer code comprises constructing a message comprising computer instructions configured to reside in non-volatile memory of said target system, thereby altering a behavior of said target system.

13. The method as in claim 8, wherein said step of selecting said particular entrance point of said target computer system comprises selecting a particular entrance point by identifying at least one interface mapped by said mapping module at said step of mapping, based on a preset preference.

14. The method as in claim 8, wherein said selecting a particular entrance point to said target computer system comprises selecting a particular entrance point, based on a preset preference related to an alteration of non-volatile memory of said target system, altering a behavior of said target system.

15. A computer-readable storage medium, having computer-executable instructions stored thereon which, when executed by a computer micro-processor, enable detecting potential cyber security vulnerabilities of a computer network, said computer-executable instructions comprise:

(a) computer-executable instructions for analyzing information contained in said at least one log file of said target computer system;
(b) computer-executable instructions for mapping a plurality of potential entrance points, accessible via said computer network, from said information contained in said at least one log file of said target computer system;
(c) computer-executable instructions for selecting a particular entrance point of said target computer system, from said plurality of potential entrance points;
(d) computer-executable instructions for generating a customary malicious computer code configured for exterior intrusion through said particular entrance point;
(e) computer-executable instructions for transmitting said customary malicious computer code, from a testing server to said particular entrance point of said target computer system, via said computer network;
(f) computer-executable instructions collecting at least one response member comprising computer data transmitted by a computing device via said computer network, in response to said customary malicious computer code transmitted via said computer network to said target computer system;
(g) computer-executable instructions for analyzing contents of said at least one response member, for presence of at least one computer datum associated with said customary malicious computer code in said at least one response member;
(h) detecting a potential cyber security vulnerability in said target computer network, associated with said particular entrance point of said target computer system, upon detecting presence of said at least one computer datum associated with said customary malicious computer code in said at least one response member.

16. The computer-readable storage medium as in claim 15, wherein said computer-executable instructions for collecting comprise at least one member selected from the group consisting of:
(a) computer-executable instructions for collecting computer data transmitted by said target computer system via said computer network to said receiving terminal of said testing server, in response to said customary malicious computer code transmitted from said sending terminal of said testing server via said computer network to said target computer system;
(b) computer-executable instructions for collecting computer data transmitted by said target computer system via said computer network to a third-party server, in response to said customary malicious computer code transmitted from said sending terminal of said testing server via said computer network to said target computer system.

17. The computer-readable storage medium as in claim 15, wherein said computer-executable instructions for collecting comprise computer-executable instructions for collecting a datum is transmitted by a client computational device via said computer network to said receiving terminal of said testing server, in response to a computer data received by said client computational device from said target computer system via said computer network.

18. The computer-readable storage medium as in claim 15, wherein said computer-executable instructions for generating comprise computer-executable instructions for generating at least one message according to message structures identified in said log file, indicative of communication traffic between said target system and interfacing counterparties thereof.

19. The computer-readable storage medium as in claim 15, wherein said computer-executable instructions for generating comprise computer-executable instructions for constructing a message comprising computer instructions configured to reside in non-volatile memory of said target system, thereby altering a behavior of said target system.

20. The computer-readable storage medium as in claim 15, wherein said computer-executable instructions for selecting comprise computer-executable instructions for selecting a particular entrance point by identifying at least one interface mapped by said mapping module at said step of mapping, based on a preset preference.

* * * * *